United States Patent
Han et al.

(10) Patent No.: US 11,249,926 B1
(45) Date of Patent: Feb. 15, 2022

(54) HOST STATE MONITORING BY A PERIPHERAL DEVICE

(71) Applicant: PetaIO Inc., Santa Clara, CA (US)

(72) Inventors: JinKi Han, San Jose, CA (US); Jongman Yoon, San Jose, CA (US)

(73) Assignee: PETAIO INC., Santa Clara, CA (US)

( * ) Notice: Subject to any disclaimer, the term of this patent is extended or adjusted under 35 U.S.C. 154(b) by 0 days.

(21) Appl. No.: 17/011,432

(22) Filed: Sep. 3, 2020

(51) Int. Cl.
| | |
|---|---|
| *G06F 3/06* | (2006.01) |
| *G06F 13/16* | (2006.01) |
| *G06F 9/38* | (2018.01) |
| *G06F 13/24* | (2006.01) |
| *G06F 13/28* | (2006.01) |

(52) U.S. Cl.
CPC ........ *G06F 13/1642* (2013.01); *G06F 9/3857* (2013.01); *G06F 13/1668* (2013.01); *G06F 13/24* (2013.01); *G06F 13/28* (2013.01)

(58) Field of Classification Search
CPC ............................... G06F 3/061; G06F 3/0659
See application file for complete search history.

(56) References Cited

U.S. PATENT DOCUMENTS

| | | | | |
|---|---|---|---|---|
| 2003/0023790 | A1* | 1/2003 | Gerhart | G06F 3/0676 710/58 |
| 2006/0039374 | A1* | 2/2006 | Belz | H04L 47/10 370/389 |
| 2013/0111175 | A1* | 5/2013 | Mogul | H04L 47/10 711/167 |
| 2015/0019731 | A1* | 1/2015 | Abts | G06F 13/1642 709/226 |
| 2018/0227394 | A1* | 8/2018 | King | H04L 67/2861 |
| 2019/0007284 | A1* | 1/2019 | Doshi | G06F 11/3485 |
| 2020/0012451 | A1* | 1/2020 | Benisty | G06F 3/0611 |
| 2021/0058334 | A1* | 2/2021 | Greth | H04L 47/629 |

* cited by examiner

*Primary Examiner* — Hyun Nam
(74) *Attorney, Agent, or Firm* — David R. Stevens; Stevens Law Group

(57) ABSTRACT

A peripheral device implements a plurality of queue sets each including a submission queue and a completion queue. Changes to the queues are monitored and arbitration parameters are adjusted, the arbitration parameters defining how submission queues are selected for retrieval of a command. An arbitration burst for a submission queue may be increased in response to tail movement for the submission queue being larger than for another submission queue. Priorities used for weighted round robin arbitration may also be adjusted based on tail movement. Arbitration burst quantities and priorities of groups of queues may also be adjusted. Head movement of the completion queues is monitored and may be used to lower priority, enable interrupt coalescing, or pause command retrieval where head movement does not meet a threshold condition.

19 Claims, 11 Drawing Sheets

HOST STATE MONITORING BY A PERIPHERAL DEVICE

BACKGROUND

Field of the Invention

This invention relates to systems and methods for implementing an interface of a peripheral device to a host system.

Background of the Invention

In the current NVMe (Non-Volatile Memory Express) standard, commands from various processor cores or applications for a particular function of a peripheral device are collected in submission queues. An arbitration function is performed by the peripheral device to select commands from the submission queues for execution. Results from completed commands are placed in a completion queue for the core or application. An interrupt to the core or application may by the also be generated by the peripheral device in response to completion of one or more commands.

It would be an improvement in the art to improve the interface between a peripheral device and a computer system having multiple cores or executing multiple applications accessing the peripheral device.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
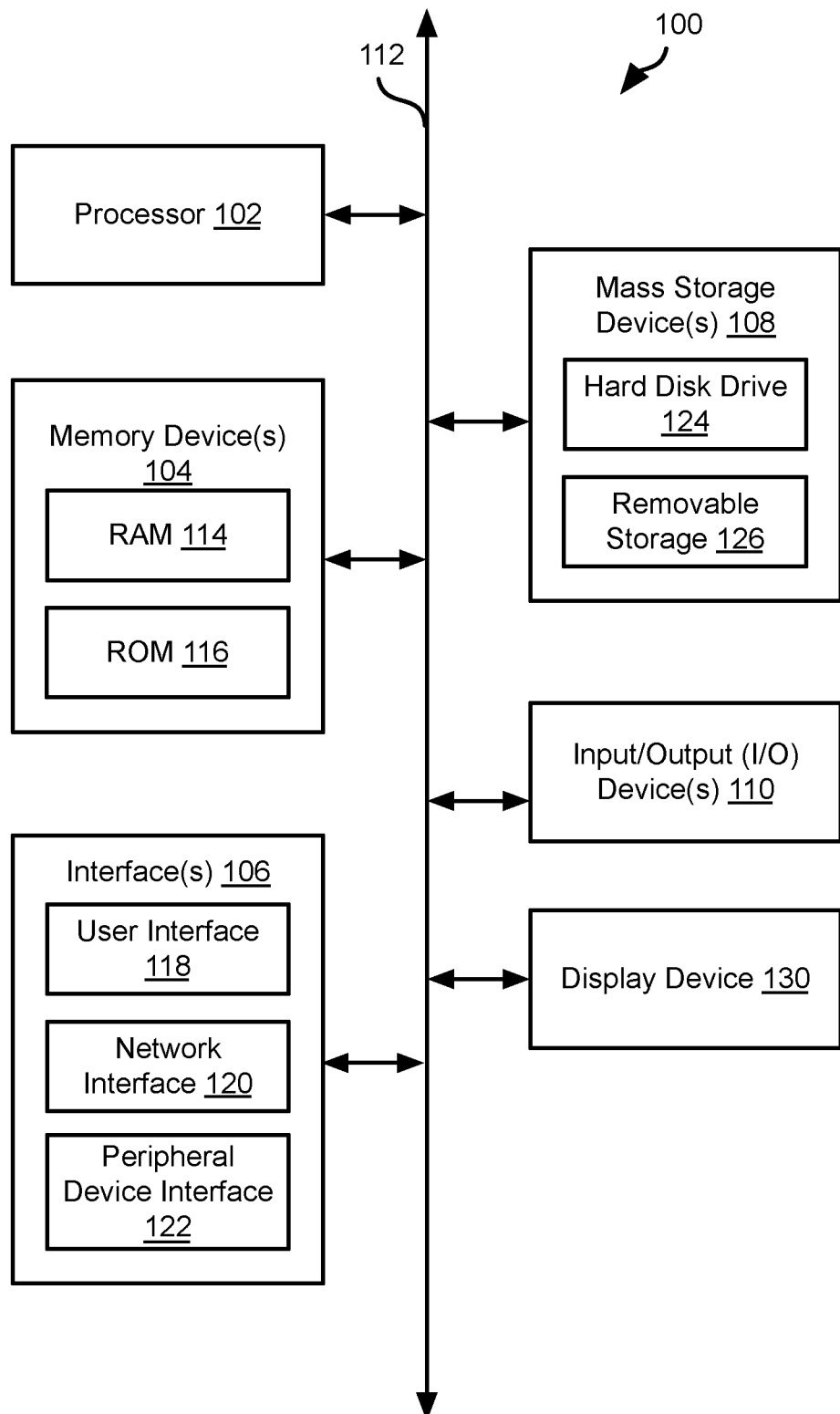
FIG. 1 is a schematic block diagram of a computing system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
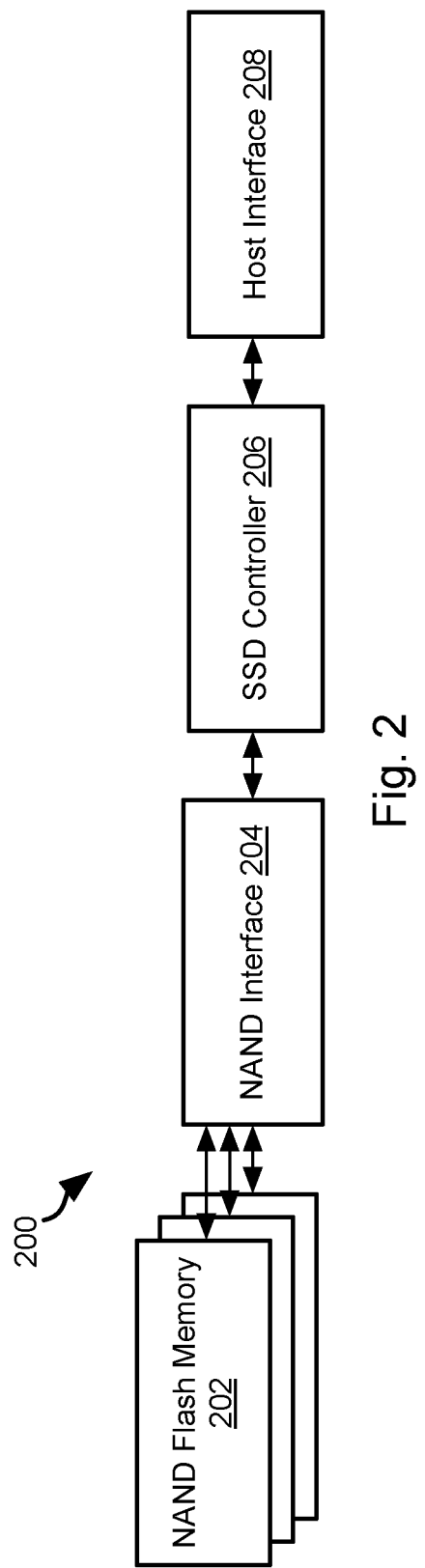
FIG. 2 is a schematic block diagram of components of a storage system suitable for implementing methods in accordance with embodiments of the invention.

Referring to FIG. 2, a typically flash storage system 200 includes a solid state drive (SSD) that may include a plurality of NAND flash memory devices 202. One or more NAND devices 202 may interface with a NAND interface 204 that interacts with an SSD controller 206. The SSD controller 206 may receive read and write instructions from a host interface 208 implemented on or for a host device, such as a device including some or all of the attributes of the computing device 100. The host interface 208 may be a data bus, memory controller, or other components of an input/output system of a computing device, such as the computing device 100 of FIG. 1.

The methods described below may be performed by the SSD controller 206. The methods described below may be used in a flash storage system 200 or any other type of non-volatile storage device. The methods described herein may be executed by any component in such a storage device.

In particular, the SSD controller 206 may be implemented as a NVMe (non-volatile memory express) controller and may be coupled to the host interface 208 by means of a PCI (peripheral component interconnect express) bus that is programmed to interact with the SSD controller 206 according to the NVMe standard.

Figure 3:
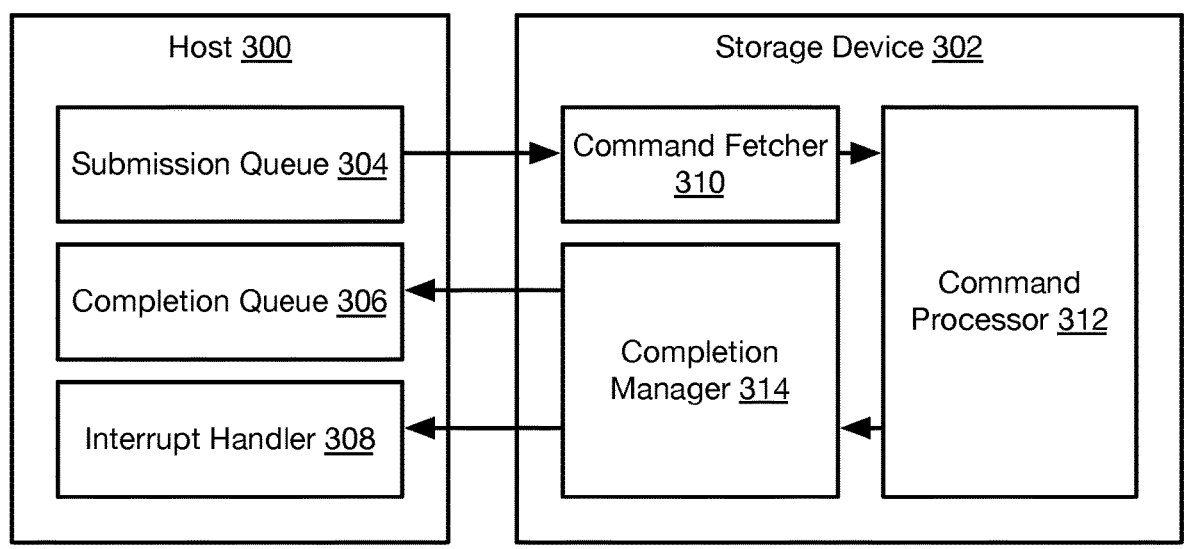
FIG. 3 is a schematic block diagram of components for performing host monitoring in accordance with an embodiment of the present invention.

FIG. 3 illustrates a typical architecture in the prior art. In it, a host 300 is coupled to a storage device 302, such as a NAND flash SSD, other SSD device, or non-volatile storage device such as a hard disk drive. The functions ascribed to the host 300 may be performed by the host interface 208 or a processor 102 of the host 300. The functions ascribed to the storage device 302 may be performed by the SSD controller 206, NAND interface 204, or some other component of the storage device 302.

The host 300 may implement a submission queue 304, a completion queue 306, and an interrupt handler 308. The submission queue 304 stores commands to be executed by the storage device 302. The completion queue 306 stores outcomes from execution of the commands by the storage device 302.

The interrupt handler 308 receives interrupts from the storage device 302 and performs functions corresponding to the interrupt. For example, the interrupt handler 308 may define a plurality of interrupts or an interrupt vector and perform a function corresponding to each interrupt when the each interrupt is set by the storage device 302. For example, where a command is a read operation, the completion queue 306 may include the data read by the storage device in response to the read operation. Accordingly, the interrupt handler 308 may respond to an interrupt from the storage device 302 by reading and removing the data from the completion queue 306 and returning it to a process that invoked the read operation. The manner in which the interrupt handler 308 implements and processes interrupts may be according to any approach for implementing known in the art.

The storage device 302 may include a command fetcher 310 that retrieves commands from the submission queue 304 and invokes execution of the commands by a command processor 312. For example, the command processor 312 may read and write data from a storage medium in response to read and write commands, respectively and return a result of the commands to a completion manager 314. The completion manager places the result of each command ("the completion entry") in the completion queue 306 and further generates an interrupt to the interrupt handler 308. The interrupt handler 308 will then read and remove the completion entries and remove them from the completion queue 306.

The storage device 302 may be embodied as a Non Volatile Memory Express (NVMe) device and the host 300 may define an interface according to the NVMe specification for interacting with an NVMe device.

Figure 4:
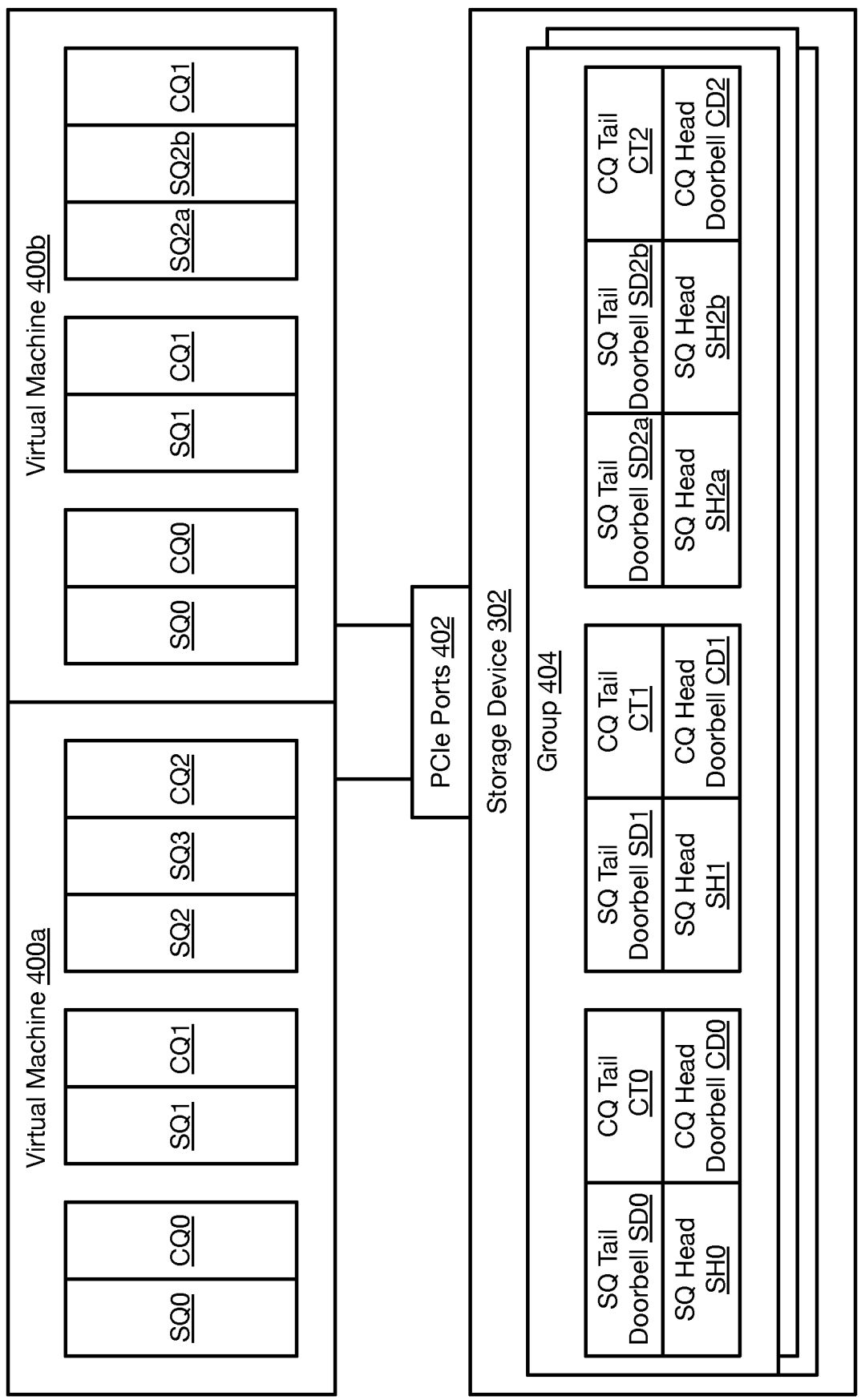
FIG. 4 is a schematic block diagram of queues of a host and storage device that may be monitored in accordance with an embodiment of the present invention.

Referring to FIG. 4, a host 300 may implement multiple virtual machines 400a, 400b (which may also be embodied as virtual applications 400a, 400b) that may each correspond to a particular application, processor core, or other grouping of functions. Each virtual machine 400a, 400b may implement a queue group as shown. Each queue group may include a plurality of queue sets in which each set includes one or more submission queues and a completion queue. In the illustrated example, each queue group includes three queue sets, SQ0 and CQ0, SQ1 and CQ1, and SQ2a, SQ2b, and CQ2. This configuration is exemplary only and any number of queue sets may be included and each queue set may include any number of submission queues.

Each queue set may correspond to a particular command, e.g. a read command, write command, or other command implemented by the storage device 302. Note that the methods herein are described with respect to a storage device 302. However, any peripheral device may benefit from the methods described herein, such as a printer, display device, actuator, or the like.

The virtual machines 400a, 400b may be coupled to the storage device 302 by way of PCIe ports or storage fabric network 402 of the storage device 302, such as by way of a PCIe bus or storage fabric network to which the virtual machines 400a, 400b are also coupled.

For each virtual machine 400a, 400b, the storage device 302 may implement a corresponding queue group 404 that includes memory, registers, or other storage that records parameters describing states of the queues of the each virtual machine 400a, 400b.

For example, for each queue set SQi, CQi (i=0, 1, and 2 in the illustrated example) there may be a corresponding set of parameters including an SQ tail doorbell SDi and an SQ head SHi for each submission queue SQi and a CQ head doorbell CDi and a CQ tail CTi for the command queue CQi. In instances, where a queue set includes multiple submission queues, there may be corresponding tail doorbells (SDia, SDib in the illustrated example) and submission queue heads (SHia, SHib in the illustrated example). In the foregoing description, reference is made to an SQ doorbell SDi and SQ head SHi, which shall be understood to apply in a like manner to the tail doorbells (SDia, SDib) and submission queue heads (SHia, SHib) of a queue set including multiple submission queues.

The SQ tail doorbell SDi is a register, flag, or input line that is written to or asserted by a virtual machine 400a, 400b to indicate that the submission queue SQi has been updated by addition of one or more commands. The SQ tail doorbell SDi may further include or be embodied as a pointer that references the location of the most recent entry to the submission queue SQi.

The SQ head register SHi records a location of the head of the submission queue SQi, i.e. the location of the oldest entry to fetch new command in the submission queue SQi. The storage device 302 will update the value stored in the register SHi when a command is removed by the storage device 302 from the corresponding submission queue SQi for execution by the storage device 302.

The CQ head doorbell register CDi records a location of the head of the completion queue CQi, i.e. the location of the oldest entry in the completion queue CQi. The virtual machine 400a, 400b will update the value stored in the register CDi when the result of execution of a command is removed by the virtual machine 400a, 400b from the corresponding completion queue CQi for processing, e.g. returning to a process that generated the command.

The CQ tail CTi is a register, flag, or input line that is written to by the virtual machine 400a, 400b when the virtual machine 400a, 400b has updated the completion queue CQi to handle the completion entries of one or more commands from the completion queue CQi. In particular, the CQ tail CTi is updated to point to the oldest entry remaining in the completion queue CQi after one or more completion entries have been read from CQi and removed by one of the virtual machines 400a, 400b for handling.

Figure 5:
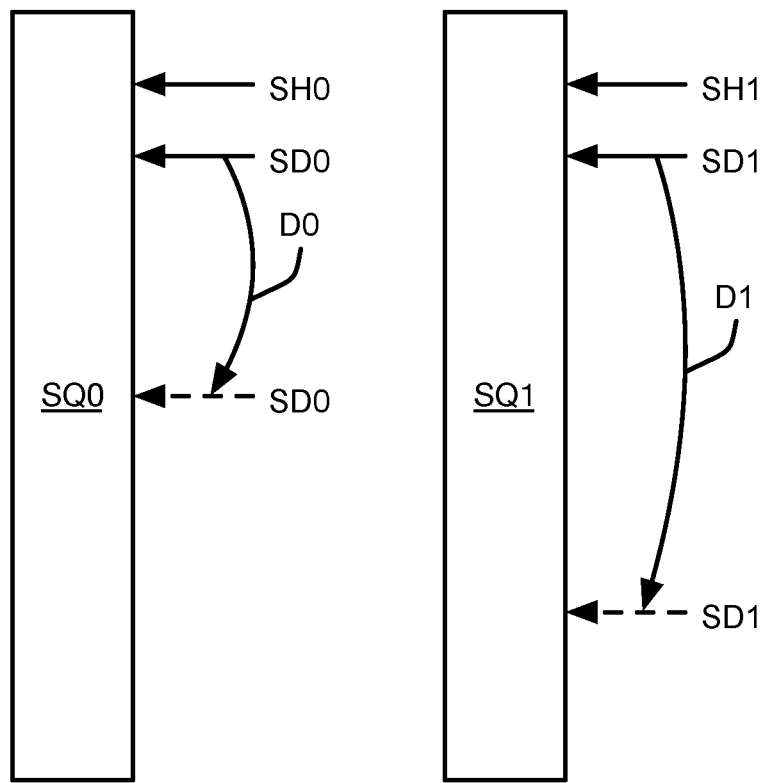
FIG. 5 illustrates monitoring of submission queue (SQ) states in accordance with an embodiment of the present invention.

Referring to FIG. 5, in some embodiment, the storage device 302 may monitor changes in the tail doorbell (e.g., SDi) of a submission queue SQi and in particular monitor changes in the tail over time. In particular, the depth of a particular submission queue SQi may change over time as commands are removed from and added to the submission queue SQi For example, the tail doorbell SD0 of submission queue SQ0 may move from pointing to a first location (solid arrow) relative to the head SH0 to pointing to a second location (dotted arrow) over a time period due to an increase in the number of commands added to SQ0. The tail doorbell SD1 of submission queue SQ1 may move from pointing to a first location (solid arrow) relative to the head SH1 to pointing to a second location (dotted arrow) over a time period due to an increase in the number of commands added to SQ1.

As is apparent in FIG. 5, the tail movement D1 of SD1 is much larger than the tail movement D0 of SD0. In some embodiments, arbitration parameters are used by the storage device 302 to select a submission queue from which to remove a command for processing. In some embodiments, these arbitration parameters may be adjusted based on tail movement of the various submission queues SQi of the various virtual machines 400a, 400b.

In the NVMe specification, command words to an NVMe device include various fields specifying how arbitration is to be performed. Definitions for these parameters in the NVMe specification are outlined below in Table 1 and Table 2. The host will send the parameters of Table 1 and Table 2 using a separate command. During NVMe device initialization, the host will send Table 1 using a "Set Features—Arbitration of Admin" Command. In prior approaches, the priority weights for High, Medium, Low are global values and are not set for individual submission queues. The host will send the parameters of Table 2 when creating each SQ. As seen in Table 2, the host can choose only type of priority (Urgent, High, Medium, Low) for each SQ. In prior approaches, the host cannot change this priority if SQ is already created. In embodiments disclosed herein, the NVMe device can change some or all of the arbitration parameters of Tables 1 and 2 for each SQ individually in a dynamic manner, e.g. in real time.

TABLE 1

Arbitration and Command Processing (Command Dword 11)

| Bits | Description |
|---|---|
| 31:24 | High Priority Weight (HPW): This field defines the number of commands that may be executed from the high priority service class in each arbitration round. This is a 0's based value. |
| 23:16 | Medium Priority Weight (MPW): This field defines the number of commands that may be executed from the medium priority service class in each arbitration round. This is a 0's based value. |
| 15:08 | Low Priority Weight (MPW): This field defines the number of commands that may be executed from the low priority service class in each arbitration round. This is a 0's based value. |
| 07:03 | Reserved |
| 02:00 | Arbitration Burst (AB): Indicates the maximum number of commands that the controller may launch at one time from a particular submission queue. The number is computed as 2^n, where n is the value specified in this field. A value of 111b indicates no limit. Thus the possible settings are 1, 2, 4, 8, 16, 32, 64, or no limit. |

TABLE 2

Creating an I/O Submission Queue (Command Dword 11)

| Bit | Description |
|---|---|
| 31:16 | Completion Queue Identifier (CQID): This field indicates the identifier of the Completion Queue to utilize for any command completion entries associated with this submission queue. The value of 0h (Admin Completion Queue) shall not be specified. |

TABLE 2-continued

Creating an I/O Submission Queue (Command Dword 11)

| Bit | Description |
|---|---|
| | If the value specified is 0h or does not correspond to a valid I/O completion queue, the controller should return an error of Invalid Queue |
| 15:03 | Reserved |
| 02:01 | Queue Priority (QPRIO): This field indicates the priority class to use for commands within this submission queue. This field is only used when the weighted round robin with urgent priority class is the arbitration mechanism selected, the field is ignored if weighted round robin with urgent priority class is not used. Mapping of values for this field to priorities are as follows:<br>00b -> Urgent<br>01b -> High<br>10b -> Medium<br>11b -> low |

In prior approaches, the priority weight is applied to all submission queues, e.g. all the submission queues of a virtual machine 400a, 400b. Likewise, the queue priority of a submission queue SQi is fixed if it was already created in prior approaches.

Figure 6A:
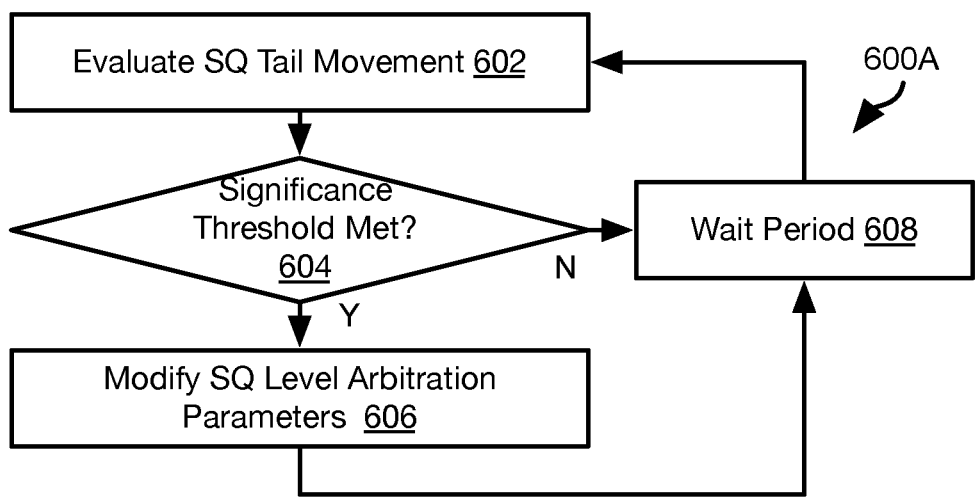
FIGS. 6A and 6B are process flow diagrams of methods for controlling SQ arbitration in accordance with SQ monitoring in accordance with an embodiment of the present invention.

FIG. 6A illustrates a method 600A for adjusting arbitration parameters according to tail movement of the submission queues of a virtual machine 400a, 400b. The method 600A may be executed by the storage device 302, such as by the SSD controller 206 of the storage device 302.

As discussed below, the tail movement of submission queues relative to one another is considered. Accordingly, the method 600A may be executed for all submission queues of a storage device 302. In an alternative approach, the method 600A is performed separately for each virtual machine 400a, 400b such that the submission queues of an individual virtual machine 400a, 400b are compared to one another according to the method 600. In the following description reference is made to "the submission queues," which shall be understood to refer to either all submission queues or the submission queues of an individual virtual machine 400a, 400b.

The method 600A may include evaluating 602 tail movement of the submission queues. For example, for each submission queue, a distance may be calculate that is a difference between the submission queue depth (difference between tail and head pointers) at a first time and the submission queue depth at a second time preceding the first time, such as prior to a previous iteration of the method 600A or some predetermined delay preceding the first time.

The method 600A may further include evaluating 604 whether any of the distances of the submission queues meets a significance threshold. In particular, step 604 may include evaluating whether a difference between the distance of a first submission queue and the distance of a second submission queue meets a significance threshold. For example, a distance ratio R may be calculated as a ratio of the distance D1 of a first submission queue and the distance D2 of a second submission queue (R=D1/D2). If R is greater than a predefined threshold X, the significance threshold may be determined to have been met by the first submission queue. The threshold X may be a predetermined value greater than 1, e.g. a value between two and 10.

If the significance threshold is found 604 to have been met by a submission queue, then the method 600A may include modifying the arbitration parameters for the submission queue and possibly one or more other submission queues. In one example, the Arbitration Burst parameter is adjusted for the submission queue. For example, where the distance ratio is R for a first submission queue relative to a second submission queue, the Arbitration Burst (AB) parameters may be adjusted. In some embodiments, the second submission queue is the submission queue with the largest distance calculated at step 602. For example, the Arbitration Burst parameter AB1 for the first submission queue may be set to be R times the Arbitration Burst parameter AB2 for the second submission queue. This may be performed by raising AB1, lowering AB2, or performing both. For example, AB1 may be raised and AB2 lowered such that AB1/AB2 is greater than or equal to R (e.g. as close as possible to R subject to limits of precision of data words used to represent AB1 and AB2 which are constrained to be powers of two in some implementations).

In some embodiments, step 606 may additionally or alternatively include raising the queue priority (QPRIO in Table 2) of the first submission queue and/or lowering QPRIO of the second submission queue.

In some embodiments, priorities of submission queues are not changed but adjustments to the parameter AB1 for the first submission queue may be a function of both the distance ratio and the priority of the first submission queue, e.g. AB1=Dmax*R*QPRIO, where Dmax is the longest distance of all of the distances determined at 602 and QPRIO is the priority weight of the first submission queue.

The method 600A may be performed periodically, such as by repeating from step 602 after waiting 608 for a delay period.

Figure 6B:
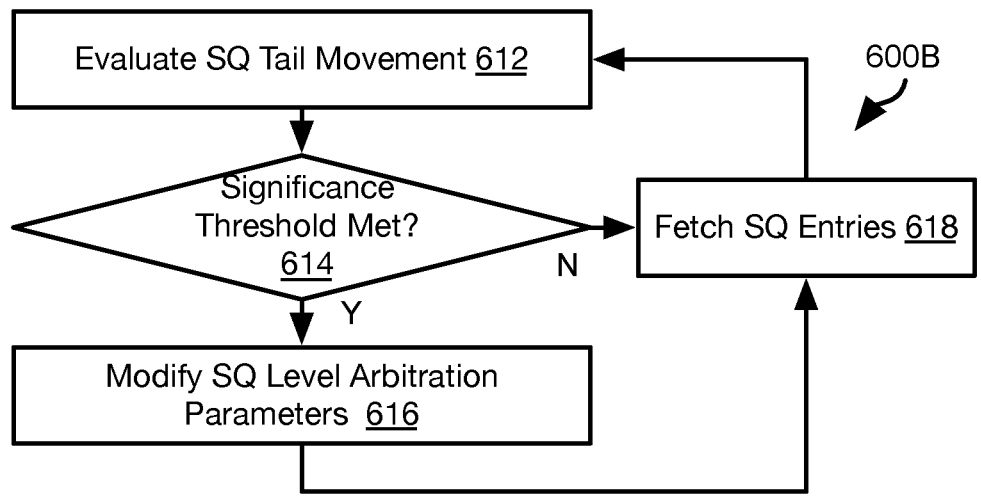

FIG. 6B illustrates an alternative method 600B for adjusting arbitration parameters according to tail movement of the submission queues of a virtual machine 400a, 400b. The method 600B may be executed by the storage device 302, such as by the SSD controller 206 of the storage device 302.

As discussed below, the tail movement of submission queues relative to one another is considered. Accordingly, the method 600B may be executed for all submission queues of a storage device 300. In an alternative approach, the method 600B is performed separately for each virtual machine 400a, 400b such that the submission queues of an individual virtual machine 400a, 400b are compared to one another according to the method 600B. In the following description reference is made to "the submission queues," which shall be understood to refer to either all submission queues or the submission queues of an individual virtual machine 400a, 400b.

The method 600B may include evaluating 612 tail movement of the submission queues. For example, for each submission queue, a distance may be calculate that is a difference between the submission queue depth (different between tail and head pointers) at a first time and the submission queue depth at a second time preceding the first time, such as prior to a previous iteration of the method 600B or some predetermined delay preceding the first time. For example, step 612 may include calculating distances Di indicating tail movement of each submission queue SQi between the first time and the second time.

The method 600B may further include evaluating 614 whether any of the distances of the submission queues meets a significance threshold. In particular, step 614 may include evaluating whether a difference between the distance of a first submission queue and the distance of a second submission queue meets a significance threshold. For example, step 614 may include calculating Dmin, which is the smallest of all of the tail movements Di calculated at step 612. Step 614 may include calculating Dmax, which is the largest of the tail movements Di calculated at step 612. Step 614 may further include calculating Dsum as the sum of all of tail movements Di calculated at step 612. The result of the evaluation of step 614 may be positive (Y) for a particular submission queue SQi in the event that Di>Dmax/Dmin (as used herein division ("/") shall be understood to be a digital approximation of division subject to limits of number of bits used to represent operands and a result of the division and limits of the algorithm used to implement the division).

If the significance threshold is found 614 to have been met by a submission queue, then the method 600B may include modifying 616 the arbitration parameters for the submission queue and possibly one or more other submission queues. In one example, the Arbitration Burst parameter is adjusted for the submission queue. For example, a distance ratio Ri for submission queue SQi may be calculated as Ri=Di/Dsum. Step 616 may therefore include setting the arbitration burst AB for SQi to AB=Ri.

As described below with respect to FIG. 8, in some embodiments, a group arbitration budget allocation GSQBAj is calculated for a queue group j. In such embodiments, the arbitration burst AB for a submission queue SQi may be calculated as AB=Ri x GSQBAj for the queue group j to which submission queue SQi belongs.

In either outcome of the evaluation 614, entries from the submission queues are fetched 618 according to the arbitration parameters as they are configured at the time of execution of step 618, which may include modification according to step 616. Fetching at step 618 may include performing a weighted round robin selection using the current state of the arbitration parameters at time of execution of step 618. As noted above, the weighted round robin selection process may be performed using any approach used to implement the weighted round robin selection process according to the NVMe standard.

Figure 7:
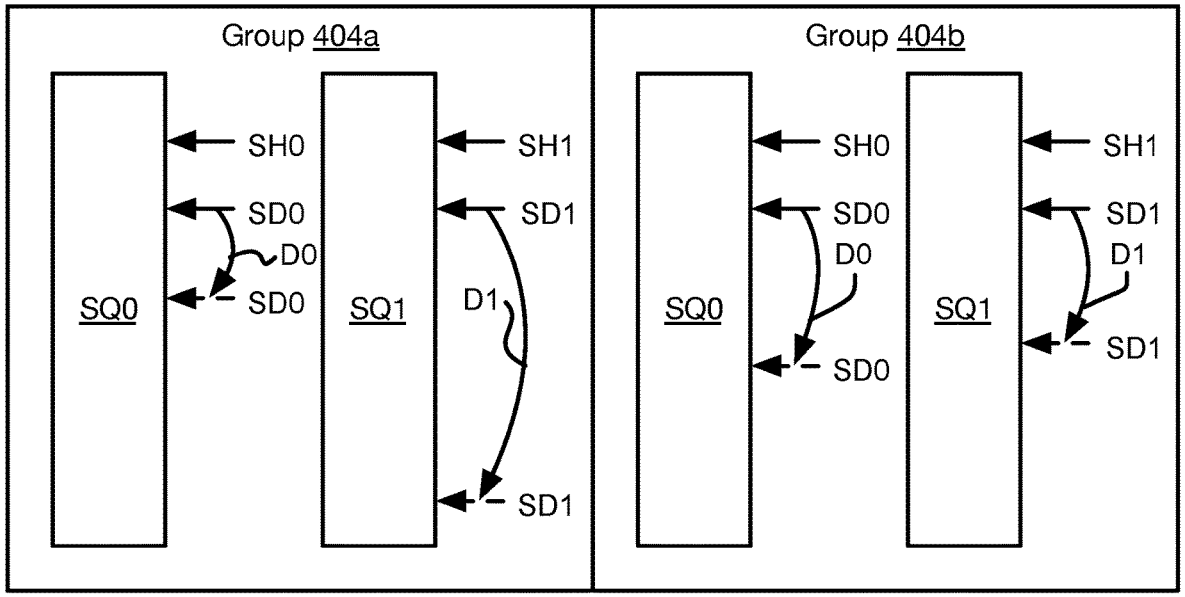
FIG. 7 illustrates group level monitoring of SQ states in accordance with an embodiment of the present invention.

Referring to FIG. 7, in some embodiments, the tail movements of the submission queues SQi of a group 404a, 404b may be aggregated and evaluated, such as with respect to an aggregation of the tail movements of another group 404b. In the illustrated example, two groups 404a, 404b are shown but any number of groups may be considered according to the methods described below.

Figure 8A:
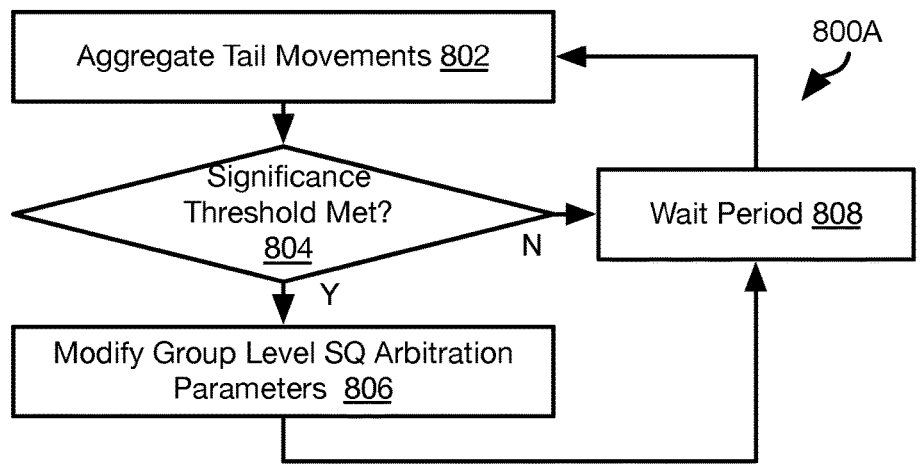
FIGS. 8A and 8B are process flow diagrams of methods for controlling group level arbitration in accordance with group level SQ monitoring in accordance with an embodiment of the present invention.

FIG. 8A illustrates a method 800A for adjusting arbitration parameters of groups 404a, 404b of submission queues according to the aggregate tail movements of the submission queues of the corresponding virtual machine 400a, 400b. The method 800A may be executed by the storage device 302, such as by the SSD controller 206 of the storage device 302.

The method 800A may include, for each group 404a, 404b, aggregating 802 tail movements of the submission queues SQi of that group. As noted above, tail movement of a submission queue may be characterized by a distance that is a difference between the submission queue depth (different between tail and head pointers) at a first time and the submission queue depth at a second time preceding the first time, such as prior to a previous iteration of the method 800A or some predetermined delay preceding the first time. Aggregating 802 may therefore include summing the distances for all of the submission queues of an individual group 404a, 404b to obtain the aggregate distance for that group 404a, 404b.

The method 800A may include evaluating 804 whether any of the aggregate distances of the groups 404a, 404b meet a threshold condition. In particular, step 804 may include evaluating whether a difference between the aggregate distance of a first group 404a and the aggregate distance of a second group 404b meets a significance threshold. For example, an aggregate distance ratio AR may be calculated as a ratio of the aggregate distance AD1 of the first group 404a and the aggregate distance AD2 of the second group 404b (AR=AD1/AD2). For example, AD2 may be the greatest aggregate distance determined at step 802. If AR is greater than a predefined threshold Y, the significance threshold may be determined to have been met by the first queue group 404a. The threshold Y may be a predetermined value greater than 1, e.g. a value between two and 10. In one example, Y is four.

If the significance threshold is found 804 to have been met by a group 404a, 404b, then the method 800A may include modifying the arbitration parameters for that group 404a, 404b and possibly one or more other groups 404a, 404b.

In particular, a group arbitration burst (GAB) may be defined for each group 404a, 404b that defines a maximum number of commands from the submission queues of that group that will be removed and processed when that group is selected according to an arbitration process.

In one example, the GAB parameter is adjusted at step 806. For example, let the aggregate distance ratio be AR, the GAB parameters be GAB1 for the first group 404a and GAB2 for the second group 404b. One or both of GAB1 and GAB2 may be changed such that GAB1 is at least R times GAB2. This may be performed by raising GAB1, lowering GAB2, or performing both. For example, GAB1 may be raised and GAB2 lowered such that AB1/AB2 is greater than or equal to R (subject to limits of precision of data words used to represent AB1 and AB2 which may be constrained to be powers of two in some implementations).

In some embodiments, step 806 may additionally or alternatively include raising a priority assigned to the first group 404a in response to the determination of step 804. Alternatively or additionally, the priority of the second group may be lowered at step 806.

In some embodiments, priorities of a group 404 are not changed but adjustments to the arbitration burst parameter GABi for a group 404 meeting the significance threshold may be adjusted as a function of both the aggregate distance ratio R and the priority of the group, e.g. GABi=Dmax*AR*GPRIO, where Dmax is the longest distance of all of the distances of the queues of the group 404 as determined at step 602 and GPRIO is the priority weight of the group 404.

The method 800A may be performed periodically, such as by repeating from step 802 after waiting 808 for a delay period.

Figure 8B:
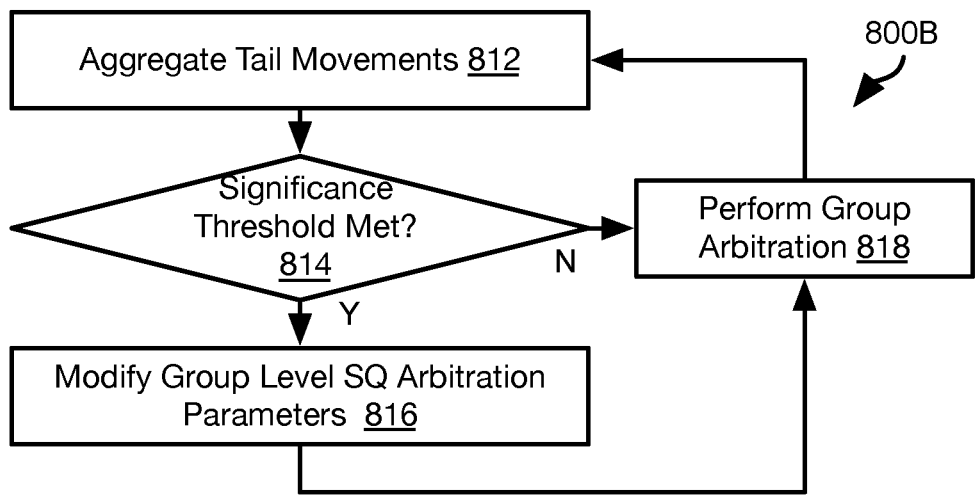

FIG. 8B illustrates an alternative method 800B for adjusting arbitration parameters of groups 404a, 404b of submission queues according to the aggregate tail movements of the submission queues of the corresponding virtual machine 400a, 400b. The method 800B may be executed by the storage device 302, such as by the SSD controller 206 of the storage device 302.

The method 800B may be performed by evaluating a plurality of groups Gj, j=1 to M, where M is the number of queue groups considered, e.g., the number of virtual machines 400a, 400b.

The method 800B may aggregating 812 tail movements of each queue group Gj, e.g. calculating tail movements Di for each submission queue SQi of the queue group as described above with respect to FIG. 6. Step 812 may include for each queue group Gj, calculating GDj as the sum of all of the tail movements Di in Gj.

The method 800B may include evaluating 814 whether any of the aggregate distances Gj meet a significance threshold condition. In particular, step 804 may include calculating GDmin as the smallest of the aggregate distances GDj of all of the queue groups Gj, j=1 to M. Step 814 may include calculating GDmax as the largest of the aggregate distances GDj of all of the queue groups Gj, j=1 to M. An aggregate distance GDj may be deemed to be significant based on its relationship to GDmax and GDmin. For example, if GDj is greater than GDmax/GDmin, then GDj may be deemed to be significant.

If the aggregate tail movement GDj for a queue group Gj is found 814 to be significant, the method 800B may include modifying 816 one or more group-level SQ arbitration parameters. For example, a ratio GRj may be calculated for the queue group Gj as GDj/GDmax.

A group arbitration budget allocation GSQBAj for the queue group Gj may also be calculated as GRj x GSQFmax, where GSQFmax is a predefined parameter defining the maximum permitted value for GSQBAj. In either outcome of the evaluation of step 814, group arbitration is performed at step 818, which may include performing the method 600B of FIG. 6B using the GSQBAj as modified at step 816 or as set initially or as set in a previous iteration of the method 800B.

Figure 9:
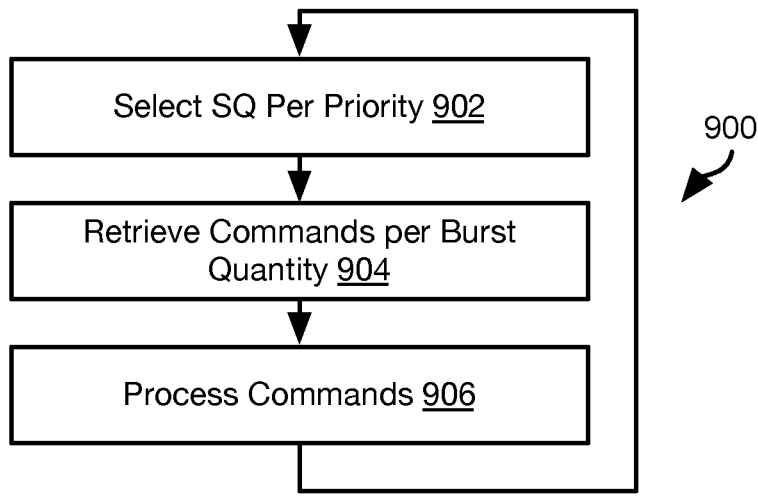
FIG. 9 is a process flow diagram of a method for implementing burst quantity and priorities for SQs in accordance with an embodiment of the present invention.

Referring to FIG. 9 the storage device 302, such as using the SSD controller 206, may perform the illustrated method 900 to process commands from the submission queues of the various groups 404a, 404b.

The method 900 may include selecting 902 a selected submission queue according to the priority thereof from among the submission queues of the various groups 404a, 404b. In particular, the selected submission queue may be selected according to the weighted round robin approach defined by the NVMe specification. However, in contrast to prior approaches, the priorities of the submission queues used in the weighted round robin approach may be those as dynamically adjusted according to the method 600A or 600B. As known in the art, the weighted round robin approach performs a plurality of selection iterations such that the method selects from various entities at each iteration with the probability of selection being a function of priority with the selections over time being distributed among the various entities.

A quantity of commands is then retrieved and removed from the selected submission queue, the quantity being equal to the arbitration burst specified for the selected submission queue. The arbitration burst value for the selected submission queue may be as determined according to the method 600A or the method 600B.

The commands retrieved are then processed 906, i.e. by executing the function specified in the commands, such as performing reading, writing, or some other programmed function of the storage device 302 or peripheral device implementing the method 900. Note that steps 904, 906 may be performed for each command separately rather than retrieving 904 the commands as a block.

Figure 10:
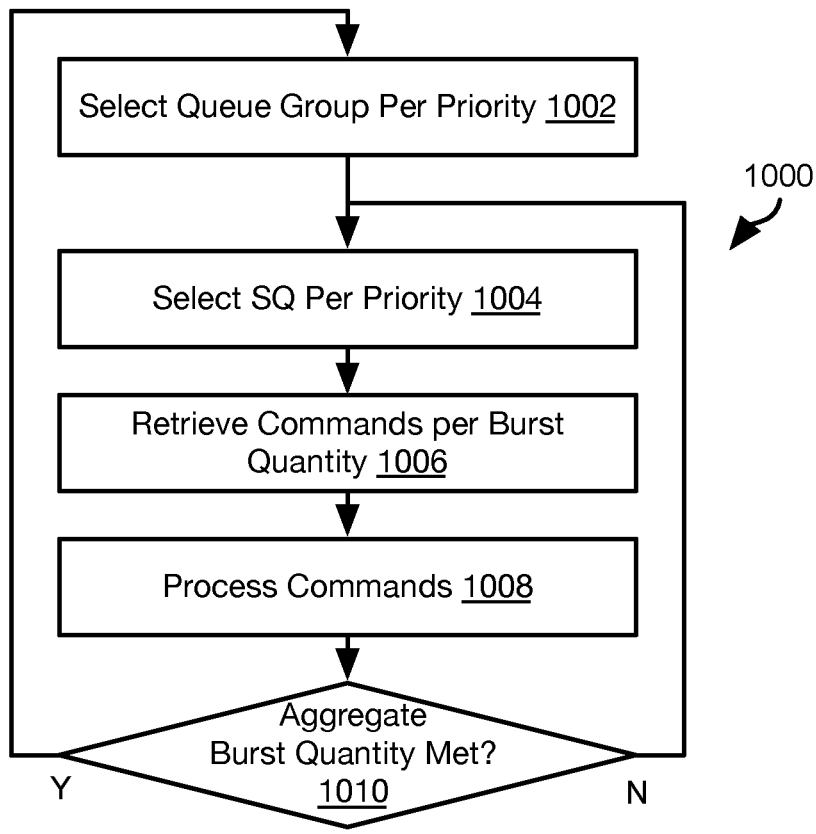
FIG. 10 is a process flow diagram of a method for implementing two-level arbitration in accordance with an embodiment of the present invention.

Referring to FIG. 10, the illustrated method 1000 may be performed to implement a two-level arbitration scheme. In particular, the method 1000 may be executed to implement arbitration according to arbitration parameters specified for individual submission queues according to either of (a) the method 600A and arbitration parameters specified for a group 404 according to the method 800a and (b) the method 600B and arbitration parameters specified for a group 404 according to the method 800b.

The method 1000 may include selecting 1002 a selected group from a plurality of groups 404 according to priorities assigned to the groups. This may include selecting the selected group according to a weighted round robin approach. In some instances, only changes to the group arbitration burst (GAB in method 800a and GSQBAj in method 800B) parameter are performed such that step 1002 is simply performed in a round robin fashion without reference to priorities.

The method 1000 may then include selecting 1004 a selected submission queue from among the submission queues of the selected group, such as according to the priorities thereof. For example, step 1004 may include selecting the selected submission queue from among the submission queues of the selected group using a weighted round robin approach.

A quantity of commands equal to the arbitration burst parameter for the selected submission queue may then be retrieved 1006 and processed 1008, such as in the manner described with respect to steps 904 and 906 of the method 900.

The method 1000 may further include evaluating 1010 whether the number of commands executed from submission queues of the selected group following step 1002 is greater than or equal to the group arbitration parameter for the selected group (GAB for the method 800A and GSQBAj for the method 800B). For example, upon selection of a group in a round of arbitration at step 1002, a counter may be initialized and augmented with the arbitration burst parameter of each submission queue selected at step 1004 and processed according to steps 1006 and 1008. When the value of this counter is greater than or equal to the group arbitration parameter of the selected group, the result of step 1010 is positive and processing continued at step 1002 with another group-level arbitration including the selection of another group 404 as the selected group.

If the value of the counter is less than the group arbitration parameter of the selected group, then processing continues at step 1004 with another arbitrated selection of a submission queue of the selected group.

Figure 11:
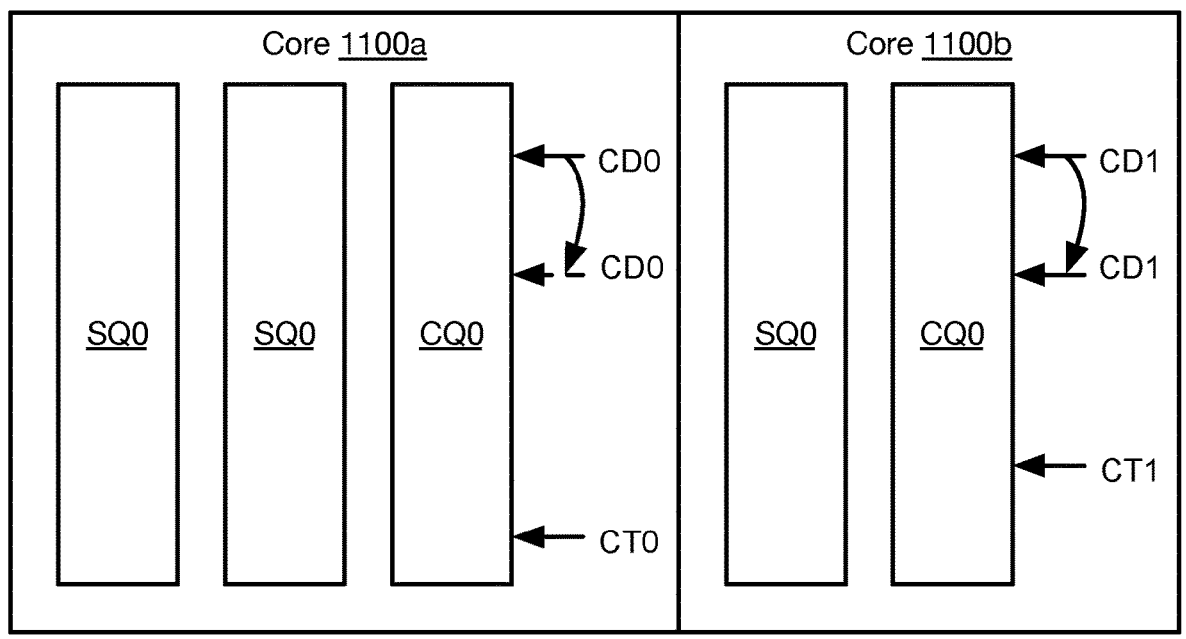
FIG. 11 illustrates per-core monitoring of completion queue (CQ) states in accordance with an embodiment of the present invention.

Referring to FIG. 11, in some embodiments, the storage device 302 may further monitor a state of the completion queues CQi of the queue sets in each group 404. In particular, changes over time to the head CHi of each completion queue CQi may be monitored. In particular, as the host 300 removes results from a completion queue CQi, the corresponding pointer CHi will move from pointing to a first position (solid arrow) at a first time to pointing to a second position (dashed arrow) at a second time after the first time.

As shown in FIG. 11, the completion queues CQi that are implemented by a particular core 1100a, 1100b (e.g., processor core of a multi-core processing device) may be grouped together and considered as a group separate from the completion queues CQi of another core 1100a, 1100b. In other embodiments, the completion queues CQi corresponding to a particular virtual machine 400a, 400b are considered as a group. In still other embodiments, the completion queues CQi corresponding to a particular application or other module are considered as a group. In the following descriptions, cores 1100a, 1100b are discussed but this functionality may be applied to completion queues CQi grouped based on any of these criteria.

Figure 12:
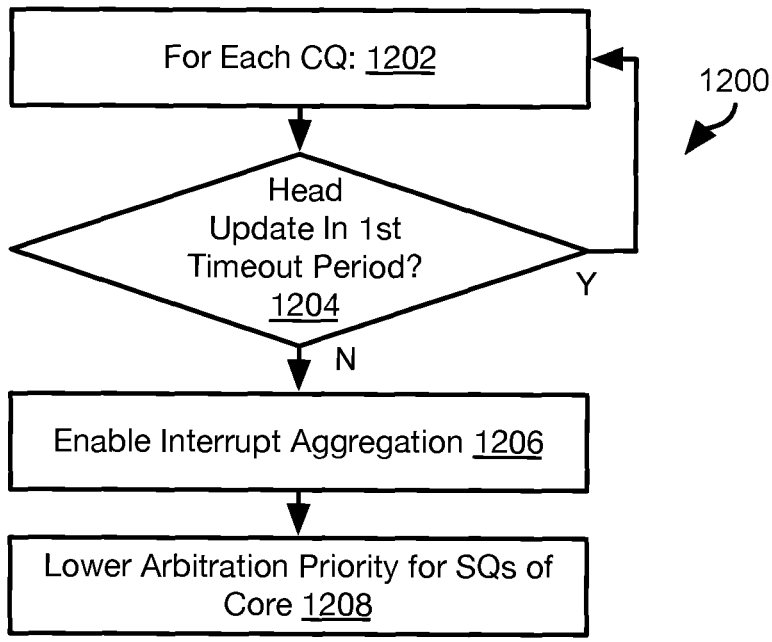
FIG. 12 is a process flow diagram of a method for controlling SQ arbitration in accordance with CQ monitoring in accordance with an embodiment of the present invention.

FIG. 12 illustrates an example method 1200 for evaluating head movement of the command queues CQi of a storage device 302. The method 1200 may be executed by the storage device 302, such as by the SSD controller 206.

The method 1200 may include processing 1202 each command queue ("the subject queue") according to the method 1200, including evaluating 1204 whether the head of the subject queue has been updated within a first timeout period. For example, this may include evaluating whether the head of the subject queue has been changed within a first timeout period preceding evaluation of the head of the subject queue at step 1204. Whether or not the head of the subject queue has been updated may be performed by detecting whether the CQ doorbell for the subject queue has been asserted or written to by the host device 300 within the first timeout period.

In some embodiments, a delay is measured between when an interrupt is sent to the host device for the subject queue and when the head for the subject queue is updated. If this delay exceeds the first timeout period, then the result of step 1204 is negative. For example, a counter may be started for the subject queue after sending an interrupt for the subject queue. When that counter reaches a threshold time value, the first timeout period may be determined to have passed.

If the head is found 1204 to not have been updated during the first timeout period, the method 1200 may include taking actions consistent with the core corresponding to the subject queue being overloaded, crashed, or otherwise not functioning properly. This may include enabling 1206 interrupt aggregation such that interrupts are sent to the host for the subject queue when the number of results in the subject queue is larger than a predefined aggregation threshold. Interrupt aggregation may additionally or alternatively include sending an interrupt when a time period since a result was added to the subject queue is longer than a predefined aggregation time. An example approach to interrupt aggregation is described in U.S. application Ser. No. 16/156,839, filed Oct. 10, 2018, and entitled "ADAPTIVE INTERRUPT COALESCING," which is hereby incorporated herein by reference in its entirety.

If the result of step 1204 is negative, the method 1200 may further include lowering 1208 the priority (QPRIO) for the submission queues belonging to the queue set including the subject queue. Step 1208 may include lowering the priority of all submission queues implemented by the core 1100a, 1100b implementing the subject queue.

If the first timeout period is not found 1204 to have passed without a head update, then the method 1200 may refrain from performing steps 1206 and 1208. For example, interrupt aggregation may be disabled.

Figure 13:
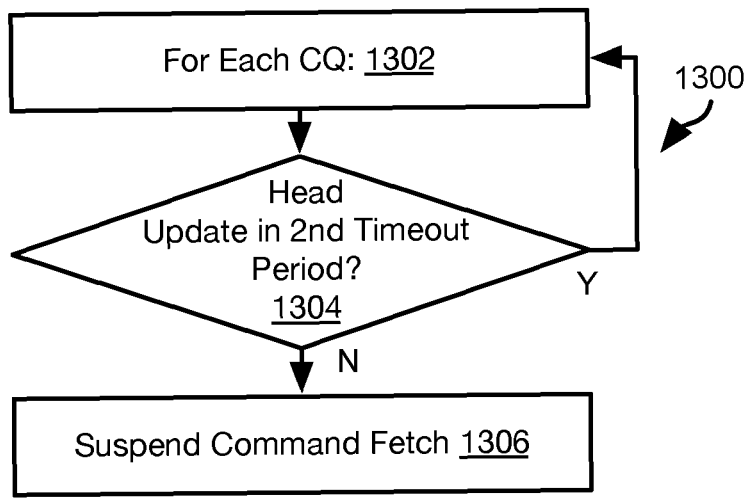
FIG. 13 is a process flow diagram of a method for controlling command processing in accordance with CQ monitoring in accordance with an embodiment of the present invention.

Referring to FIG. 13, the illustrated method 1300 may be executed in addition to or as an alternative to the method 1200. The method 1300 may be executed by the storage device 302, such as by the SSD controller 206.

The method 1300 may include processing 1302 each command queue ("the subject queue") according to the method 1300, including evaluating 1304 whether the head of the subject queue has been updated within a second timeout period that is larger than the first time out period (e.g., within 2 and 10 times longer). The manner in which the time elapsed without a head update is defined may be according to any of the approaches for determining the elapsed time without a head update as discussed above with respect to step 1204.

If the elapsed time without a head update is found 1304 to be greater than or equal to the second timeout period, the method 1300 may include suspending 1304 fetching of commands from the submission queue of the queue set including the subject queue. In some embodiments, step 1304 suspending fetching of commands from all submission queues implemented by the core 1100a, 1100b implementing the subject queue.

If the second timeout period is not found 1304 to have passed without a head update, then the method 1300 may refrain from performing step 1306.

The present invention may be embodied in other specific forms without departing from its spirit or essential characteristics. The described embodiments are to be considered in all respects only as illustrative, and not restrictive. In particular, although the methods are described with respect to a NAND flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. A method comprising:
selecting a queue set from among a plurality of queue sets according to arbitration parameters, the plurality of queue sets including the queue set and another queue set;
removing a command from a corresponding submission queue of the queue set;
executing the command;
evaluating a change in depth of the submission queue over time including calculating a tail movement of the queue set;
determining that the tail movement is greater than another tail movement of the other queue set; and
in response to the change in depth and determined greater tail movement, altering the arbitration parameters including increasing a priority of the queue set relative to the other queue set.

2. The method of claim 1, further comprising:
calculating tail movement of a tail of a corresponding submission queue for each queue set in the plurality of queue sets;
determining a longest tail movement of the tail movements of the plurality of queue sets;
for each queue set of the plurality of queue sets, calculating a distance ratio that is a ratio of the tail movement of the each queue set relative to the longest tail movement;
setting a burst quantity for each queue set of the plurality of queue sets as a function of the distance ratio;
selecting a further queue set from among the plurality of queue sets according to priorities of the plurality of queue sets; and
processing a group of commands from the submission queue of the further queue set in number equal to the burst quantity of the queue set.

3. The method of claim 1, further comprising:
calculating tail movement of a tail of a corresponding submission queue for each queue set in the plurality of queue sets;
determining a longest tail movement of the tail movements of the plurality of queue sets;
for each queue set of the plurality of queue sets for which the tail movement thereof meets a first significance condition, calculating a distance ratio of the tail movement relative to the longest tail movement; and
setting a burst quantity for each queue set of the plurality of queue sets as a function of the distance ratio.

4. The method of claim 3, further comprising:
selecting the queue set from among the plurality of queue sets according to the arbitration parameters; and
processing a number of commands from the submission queue of the queue set equal to the burst quantity of the queue set.

5. The method of claim 3, further comprising:
defining a plurality of queue groups, each queue group including a subset of the plurality of queue sets; and
for each queue group of the plurality of queue groups:
aggregating tail movements of the tails of the corresponding submission queues of the subset of the plurality of queue sets to obtain an aggregate tail movement;
determining a longest aggregate tail movement of the aggregate tail movements of the plurality of queue groups;
for each queue group of the plurality of queue groups for which the aggregate tail movement thereof meet a second significance condition, calculating an aggregate distance ratio of the longest aggregate tail movement relative to the aggregate tail movement of the each queue group; and
setting an aggregate quantity for each queue group according to the aggregate distance ratio.

6. The method of claim 1, further comprising, for each queue set of the plurality of queue sets:
monitoring a state of a head of the completion queue of the each queue set; and
when the state of the completion queue of the each queue set has a change over time lower than a first threshold condition, reducing priority of the each queue set in the arbitration parameters.

7. The method of claim 6, further comprising when the state of the completion queue of the each queue set has a change over time lower than a second threshold condition that is lower than the first threshold condition, pausing command execution for the each queue set.

8. The method of claim 1, further comprising:
generating interrupts to a host device;
removing results from completion queues of the plurality of queue sets in response to the interrupts and updating heads of the completion queues; and
performing for each queue set of the plurality of queue sets:
monitoring a state of the head of the completion queue of the each queue set; and
when the state of the completion queue of the each queue set has a change over time lower than a threshold condition, enabling interrupt coalescing for the each queue set such that interrupts are generated only when a number of results in the completion queue is above an aggregation threshold.

9. The method of claim 1, further comprising:
removing a command from a submission queue in accordance with the altered arbitration parameters and a set burst quantity corresponding to the submission queue; and
executing the command.

10. A peripheral device comprising:
a processor; and
system memory coupled to the processor and storing instructions configured to cause the processor to:
select a queue set from among a plurality of queue sets according to arbitration parameters, the plurality of queue sets including the queue set and another queue set;
remove a command from a corresponding submission queue of the queue set;
execute the command;
evaluate a change in depth of the submission queue over time including calculating tail movement of the queue set;
determine the tail movement is greater than another tail movement of the other queue set; and
in response to the change in depth and determined greater tail movement, alter the arbitration parameters including increasing a priority of the queue set relative to the other queue set.

11. The peripheral device of claim 10, further comprising instructions configured to:
   calculate tail movement of a tail of a corresponding submission queue for each queue set in the plurality of queue sets;
   determine a longest tail movement of the tail movements of the plurality of queue sets;
   for each queue set of the plurality of queue sets for which the tail movement thereof meets a first significance condition, calculate a distance ratio that is a ratio of the tail movement of the each queue set relative to the longest tail movement;
   set a burst quantity for each queue set of the plurality of queue sets as a function of the distance ratio;
   select a further queue set from among the plurality of queue sets according to priorities of the plurality of queue sets; and
   process groups of commands from the submission queue of the queue set in number equal to the burst quantity of the queue set.

12. The peripheral device of claim 10, further comprising instructions configured to:
   calculate tail movement of a tail of corresponding submission queue for each queue set in the plurality of queue sets;
   determine a longest tail movement of the tail movements of the plurality of queue sets;
   for each queue set of the plurality of queue sets for which the tail movement thereof meets a significance condition, calculate a distance ratio of the tail movement relative to the longest tail movement; and
   set a burst quantity for each queue set of the plurality of queue sets as a function of the distance ratio.

13. The peripheral device of claim 12, further comprising instructions configured to:
   select the queue set from among the plurality of queue sets according to the arbitration parameters; and
   process a number of commands from the submission queue of the queue set equal to the burst quantity of the queue set.

14. The peripheral device of claim 12, further comprising instructions configured to:
   define a plurality of queue groups, each queue group including a subset of the plurality of queue sets; and
   for each queue group of the plurality of queue groups:
      aggregate tail movements of the tails of the corresponding submission queues of the subset of the plurality of queue sets to obtain an aggregate tail movement;
   determine a longest aggregate tail movement of the aggregate tail movements of the plurality of queue groups;
   for each queue group of the plurality of queue groups for which the aggregate movement thereof meets a second significance condition, calculate an aggregate distance ratio of the longest aggregate tail movement relative to the aggregate tail movement of the each queue group; and
   set an aggregate quantity for each queue group according to the aggregate distance ratio.

15. The peripheral device of claim 10, further comprising instructions configured to:
   monitor a state of a head of the completion queue of the each queue set; and
   when the state of the completion queue of the each queue set has a change over time lower than a first threshold condition, reduce priority of the each queue set in the arbitration parameters.

16. The peripheral device of claim 15, further comprising instructions configured to, when the state of the completion queue of the each queue set has a change over time lower than a second threshold condition that is lower than the first threshold condition, pausing command execution for the each queue set.

17. The peripheral device of claim 10, further comprising instructions configured to:
   generate interrupts to a host device; and
   perform for each queue set of the plurality of queue sets:
      monitoring a state of a head of the completion queue of the each queue set; and
      when the state of the completion queue of the each queue set has a change over time lower than a threshold condition, enabling interrupt coalescing for the each queue set such that interrupts are generated only when a number of results in the completion queue is above an aggregation threshold.

18. A method comprising:
   evaluating a change in depth of corresponding submission queues of a plurality of queue sets over time including calculating a tail movement for each of the plurality of queue sets;
   determining the longest calculated tail movement from among the calculated tail movements;
   for each of the plurality of queue sets having a calculated tail movement that meets a significance condition:
      calculating a distance ratio of the calculated tail movement relative to the longest calculated tail movement; and
      setting a burst quantity for the queue set as a function of the calculated distance ratio; and
   altering arbitration parameters associated with the plurality of queue sets including changing a priority of at least one queue set in the plurality of queue sets based on the calculated tail movements.

19. The method of claim 18, further comprising:
   selecting a queue set from among the plurality of queue sets according to the altered arbitration parameters; and
   processing a number of commands from the submission queue of the queue set in accordance with the corresponding burst quantity.

* * * * *